(12) United States Patent
Wang et al.

(10) Patent No.: US 12,390,972 B2
(45) Date of Patent: Aug. 19, 2025

(54) NON-INFLATABLE HOLLOW TIRE MOULD

(71) Applicant: Jiangsu Risingsun Tyre Co., Ltd, Xuzhou (CN)

(72) Inventors: Mingjiang Wang, Xuzhou (CN); Li Liu, Xuzhou (CN); Shipeng Wen, Xuzhou (CN); Feng Wang, Xuzhou (CN)

(73) Assignee: Jiangsu Risingsun Tyre Co. Ltd., Yitang Town Xuzhou (CN)

( * ) Notice: Subject to any disclaimer, the term of this patent is extended or adjusted under 35 U.S.C. 154(b) by 1189 days.

(21) Appl. No.: 17/275,636

(22) PCT Filed: Apr. 21, 2019

(86) PCT No.: PCT/CN2019/083580
§ 371 (c)(1),
(2) Date: Nov. 3, 2021

(87) PCT Pub. No.: WO2020/057118
PCT Pub. Date: Mar. 26, 2020

(65) Prior Publication Data
US 2022/0048232 A1 Feb. 17, 2022

(30) Foreign Application Priority Data
Sep. 19, 2018 (CN) .......................... 201811092275.7

(51) Int. Cl.
*B29C 48/30* (2019.01)
*B29C 33/76* (2006.01)
(Continued)

(52) U.S. Cl.
CPC .............. *B29C 48/30* (2019.02); *B29C 33/76* (2013.01); *B29D 30/02* (2013.01); *B29L 2030/00* (2013.01)

(58) Field of Classification Search
CPC ......... B29C 48/30; B29C 33/76; B29D 30/02; B29L 2030/00
(Continued)

(56) References Cited

U.S. PATENT DOCUMENTS 4,655,987 A 4/1987 Zertuche

FOREIGN PATENT DOCUMENTS

CN 2303720 Y 1/1999
CN 1686700 A 10/2005
(Continued)

OTHER PUBLICATIONS

International Search Report (including English Translation) and Written Opinion of the International Searching Authority, mailed Jul. 3, 2019, for corresponding International Application No. PCT/CN2019/083580, 10 pages.

*Primary Examiner* — Christina A Johnson
*Assistant Examiner* — Xue H Liu
(74) *Attorney, Agent, or Firm* — Klarquist Sparkman, LLP (57) ABSTRACT

An inflation-free hollow tire modeling die comprises a die base, at least one die core, and a core holder. A front face of the die base has a concave feeding cavity, and a bottom of the feeding cavity has a modeling cavity running through a back face of the die base. The core holder has an arched or triangular support. Feet of the support are fixed to an outer edge portion of the feeding cavity. A top of the support is located in front of the modeling cavity. The die cores are suspended and their main bodies are columnar. The length direction of the die cores is perpendicular to the front and back faces of the die base. A head end of each die core is fixedly connected to the core holder. A tail end of each die core is extended backward and positioned in the modeling cavity.

20 Claims, 8 Drawing Sheets

(51) Int. Cl.
  *B29D 30/02*    (2006.01)
  *B29L 30/00*    (2006.01)
(58) Field of Classification Search
  USPC ..................................................... 425/576.1
  See application file for complete search history.

(56) References Cited

FOREIGN PATENT DOCUMENTS

| | | | |
|---|---|---|---|
| CN | 1693046 | A | 11/2005 |
| CN | 109049607 | A | 12/2018 |

NON-INFLATABLE HOLLOW TIRE MOULD

CROSS-REFERENCE TO RELATED APPLICATIONS

This application claims the benefit of and priority to Chinese Patent Application No. CN 201811092275.7, entitled "INFLATION-FREE HOLLOW TIRE MODELING DIE," which was filed on Sep. 19, 2018, and issued as Chinese Patent No. CN 109049607B on Apr. 28, 2020. The entirety of Chinese Patent Application No. CN 201811092275.7 and the corresponding Chinese Patent No. CN 109049607B are incorporated herein by reference as if set forth fully herein.

BACKGROUND

Technical Field

The present disclosure relates to a die of a rubber tire, and in particular, to an inflation-free hollow tire extrusion molding die.

Related Art

Because of excellent performance, inflation-free hollow tires have become highly popular products in the market, and are widely applied to conventional vehicles, and numerous innovative mobile devices such as electric self-balancing scooters and robots. However, the existing publicly-known inflation-free hollow tire modeling die has some technical defects. The technical defects become a bottleneck in limiting the quality and yield of inflation-free hollow tires, and are specifically reflected as follows: 1. Chinese Patent No. ZL200510068622.9 discloses an "inflation-free multi-hole hollow tire extrusion die". Among a plurality of components included in the die, a die block 6 actually has a decisive effect on an inner cavity of a tire and a force-bearing holder, but before the die block 6, a bulky supporting body 10, a connection member 7, and a die chassis 8 are further disposed. In an aspect, these auxiliary members used for positioning and fixing increase resistance of an extruder. As a result, the connection member of the die is usually damaged, reducing the operating efficiency. In another aspect, because rubber extruded from a discharge outlet of an extrusion molding machine, when being in a position in an inner cavity 5 of a die holder 2, has been formed into a tire blank prototype with a relatively large inner cavity through the supporting body 10, and such a tire blank with an inner cavity and a circumferential tire wall further needs to continue to be extruded and deformed, namely, the tire wall is extruded inward. At least one force-bearing holder dividing the inner cavity into a plurality of cavities is formed through extrusion in the inner cavity, which reduces strength of the tire wall; and causes strength of the force-bearing holder modeled by extruding the tire wall to be relatively low, and finally affects quality of a finished tire. In still another aspect, both an acute angle where the supporting body 10 is connected to the connection member 7 and an acute angle where the supporting body 10 is split into the die block 6 are formed into dead angles of motion of rubber materials, causing retardation of some rubber materials or forming an eddy current. 2. Chinese Patent No. ZL200510039108.2 discloses another "inflation-free multi-hole hollow tire extrusion die". In the die, the auxiliary members in the foregoing previous patent are replaced with a "thin-wall connection sheet 6" to implement positioning and fixing of the "die core 2" and the "die block 5", thereby reducing extrusion resistance of rubber. However, new problems are caused. First, the "thin-wall connection sheet 6" is easy to break or damage under a huge extrusion pressure, and consequently the die needs to be frequently replaced or repaired, which similarly reduces production efficiency. Additionally, before reaching the discharge hole 4 of the die core 2 through the feeding through-hole 3 of the die frame 1, the rubber materials extruded from the discharge outlet of the extruder have been formed into a solid structure. Only when the rubber is extruded from the discharge hole 4, the die block 5 is formed into a required inner cavity and force-bearing holder in the solid structure. In addition, the "thin-wall connection sheet 6" also affects strength of the force-bearing holder, and consequently, quality of a produced tire blank is also reduced finally. 3. Technologies in the foregoing two patents have a common technical defect, that is, before entering the extrusion molding cavity 4 or the discharge hole 4, the rubber materials first need to pass through a vertical die base face, and the rubber materials are retarded on the die base face to form an eddy current, and an acute angle between two edges of the die base face is also formed into a dead angle of motion of the rubber materials. Due to retardation of some rubber materials or the formed eddy current, the rubber materials are heated unevenly in the die, and consequently the temperature of local rubber materials is increased to cause self-vulcanization or scorching. After the self-vulcanization or scorching of the rubber materials, in particular, the scorching, scorched blocks left in the tire blank severely affect the extrusion process of the tire blank and the physical performance of the finished tire.

SUMMARY

Technical Problems

For defects in the existing technology, the present disclosure provides an inflation-free hollow tire modeling die.

Technical Solutions

The inflation-free hollow tire modeling die of the present disclosure includes a die base, die cores, and a core holder; the front face, facing a discharge outlet of an extrusion molding machine, of the die base is provided with a concave feeding cavity, and the bottom of the feeding cavity is provided with a modeling cavity running through the back face of the die base; the core holder is an arched support or a triangular support, supporting feet of the support are fixed to an outer edge portion of the feeding cavity, and the top of the support is located in front of the modeling cavity; the die cores are suspended die cores whose main bodies are columnar, each die core corresponds to an inner cavity of a tire, the length direction of the die core is perpendicular to the front face and the back face of the die base, a head end of the die core is fixedly connected to the core holder, and a tail end of the die core is extended backward and positioned in the modeling cavity; and the shape of the cross-section of the die core and a relative position of the die core in the modeling cavity are matched with the internal structure and the tire shape of the tire, and the shape of the cross-section of the modeling cavity is matched with the contour of the tire.

Main components of the inflation-free hollow tire modeling die are divided into three major parts: the die base, the die cores, and the core holder, and innovation of the inflation-free hollow tire modeling die is embodied in the concave feeding cavity structure on the die base, the suspended structures of the die cores, and the arched or triangular structure of the core holder. The die base having the front face and the back face parallel to each other is the base body of the modeling cavity and the feeding cavity, and it is better to integrally manufacture and mold the modeling cavity, the concave feeding cavity, and the die base; and the die base is further a supporting base of the core holder. The arched or triangular core holder is used for fixing the die cores, the core holder spans the feeding cavity, and the top of the core holder is located in front of the modeling cavity. The die cores are positioned in the feeding cavity and the modeling cavity through the fixing function of the core holder. Columnar portions, suspended in the modeling cavity, of the die cores are a main body of the die core, and the main body is not in contact with the cavity wall of the modeling cavity. When a tire with a relatively small inner cavity is manufactured, the head end of the die core may have the same thickness as that of the main body; and when a tire with a relatively large inner cavity is manufactured, the head end of the die core is relatively thin, the main body is relatively thick, the die core gradually becomes thicker from the head end of the die core to the main body, and the head end of the die core and the core holder may be manufactured integrally.

The surface of the concave feeding cavity of the present disclosure inflation-free hollow tire modeling die is correspondingly manufactured into a trumpet-mouth curved face being wide at the top and narrow at the bottom, such as a bowl-shaped concave face, a trumpet-shaped concave face, or a conical concave face according to different internal structures and tire shapes of tires. When a tire with a relatively simple single-cavity or double-cavity structure is produced, the feeding cavity is preferably manufactured into a trumpet-shaped concave face, and a pressure formed by the concave face to the rubber materials is in transition from an early sharp increase to a late gentle increase, and is finally in transition to a constant pressure. When a tire with a relatively complex internal structure is produced, the feeding cavity may be set to a bowl-shaped concave face, and a pressure formed by the concave face to the rubber materials is in transition from an early gentle increase to a late sharp increase, and finally reaches a maximum pressure when reaching the modeling cavity, thereby improving fatigue resistance of the stressed tire.

Further, a protrusion at an intersection between the feeding cavity and the modeling cavity of the inflation-free hollow tire modeling die of the present disclosure is set to an outer chamfer such as a smooth rounded transitional surface.

To reduce adverse effects of the core holder, the cross-section of the core holder of the present disclosure has a streamlined ridge.

The streamlined cross-section of the ridge of the foregoing core holder is preferably is in an egg shape, a pear shape, or a heart shape being narrow at the top and wide at the bottom.

The arched support of the present disclosure may be manufactured into two or more arched support members that are cross-connected to each other; according to a position requirement of the die core, the arched support certainly may alternatively be manufactured into two or more arched support members disposed at intervals and in parallel; and to ensure accurate positioning of the die core and the core holder, relatively thin connection supporting members may be added between the die cores and between the core holder.

The arched support may be further two only or more docked half-arched core support members.

An angle in a position where the foregoing triangular support, cross-connected arched support members or docked half-arched support members are connected is set to an inner chamfer, and is preferably manufactured into a smooth curved face.

An angle in a position where the supporting feet of the core holder are connected to the feeding cavity is set to an inner chamfer, and is preferably manufactured into a smooth curved face.

Beneficial Effects

Compared with the existing technology, advantages the inflation-free hollow tire modeling die provided in the present disclosure are mainly embodied in the following three aspects.

The surface of the feeding cavity on the front face of the die base is manufactured into the concave face, and in particular, when the surface of the feeding cavity is manufactured into a streamlined, bowl-shaped, or trumpet-shaped concave face, the concave face is formed into a pressure concave face for extruding the rubber materials. In an aspect, the concave face decides a pressure change process in a tire blank molding process, thereby affecting mechanical performance of the tire; and in another aspect, this buffering concave face may avoid forming a dead angle or forming an eddy current in the die in the rubber material extrusion process, and avoid self-vulcanization or scorching of the rubber materials.

The arched core holder or triangular core holder has a streamlined structure or beveled structure, and in particular, when the cross-section of the core holder is also manufactured into a streamlined ridge being narrow at the top and wide at the bottom, these structures not only may disperse or reduce resistance caused by the core holder to the rubber materials, to prevent the die or extruder from being damaged, but also may reduce adverse effects caused to the internal structure and physical performance of the tire since the core holder retards motion of the rubber materials.

The head end of the suspended die core is far away from the modeling cavity at the bottom of the die base, so that after the rubber materials are squeezed in from the discharge outlet of the extrusion molding machine, when the rubber materials just pass through the core holder, and just come in contact with the head end of the die core, a hollow cavity body of the inner cavity of the tire can be first formed. While a multi-cavity inflation-free tire with more than two tire cavities is produced, at least one force-bearing holder is further formed between the tire cavities; and then, the rubber materials having the prototype of the inner cavity, or the prototype of the inner cavity and the force-bearing holder continue to be extruded in a subsequent process of moving to the modeling cavity, so that compactness of the tire wall of the tire blank and the force-bearing holder may be enhanced, and finally the produced finished tire has relatively good tensile and tearing strength, and has excellent abrasion resistance and fatigue resistance.

In the figures: 10 is a die base, 11 is a feeding cavity, 111 is a bowl-shaped concave face of a feeding cavity, 112 is a trumpet-shaped concave face of a feeding cavity, 113 is a conical concave face of a feeding cavity, 12 is a modeling cavity, 20 is a die core, and 30 is a core holder.

DETAILED DESCRIPTION

The accompanying drawings disclose specific embodiments of the present disclosure without limitations, and the specific embodiments are further described below with reference to the accompanying drawings.

Embodiment 1

Figure 1:
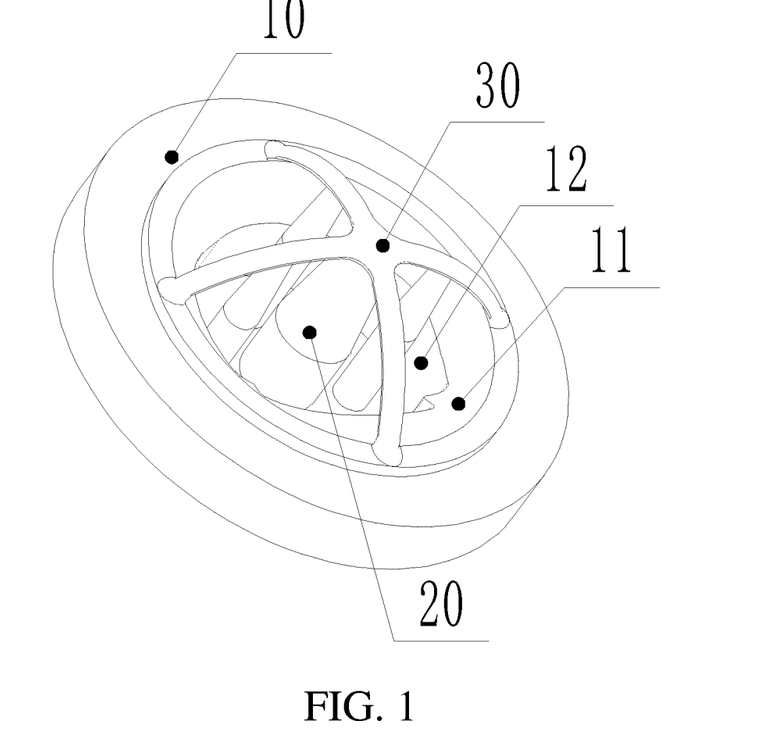
FIG. 1 is a schematic three-dimensional structural diagram of Embodiment 1.

Referring to FIG. 1, an inflation-free hollow tire modeling die of this embodiment is used for producing a four-cavity inflation-free tire. The die includes a die base 10, four die cores 20, and a core holder 30 that is formed by two cross-connected arches, the four die cores 20 are connected to four branches of the core holder 30, supporting feet of the four branches of the core holder 30 are fixed to an outer edge portion of a feeding cavity 11, and the arch apex of the core holder is located in front of a modeling cavity 12. To ensure mechanical strength of the die, the die base 10, the die cores 20, and the arched core holder 30 of this embodiment are all made of steel. Provided that the strength is ensured, the die base, the die cores, and the core holder certainly may alternatively be made of another substitute material.

The arch shape in this embodiment or the present disclosure refers to a convex arc shape, being high in the middle and low at two ends, of an arched bridge or arched door.

Figure 2:
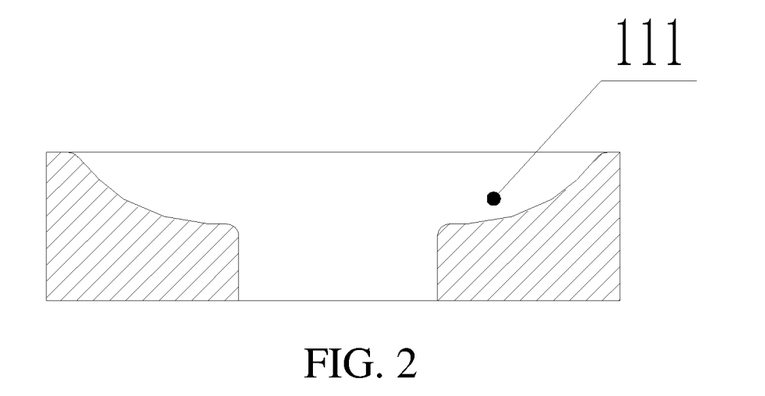
FIG. 2 is a cross-sectional view of a feeding cavity having a bowl-shaped concave face of Embodiment 1.
Figure 3:
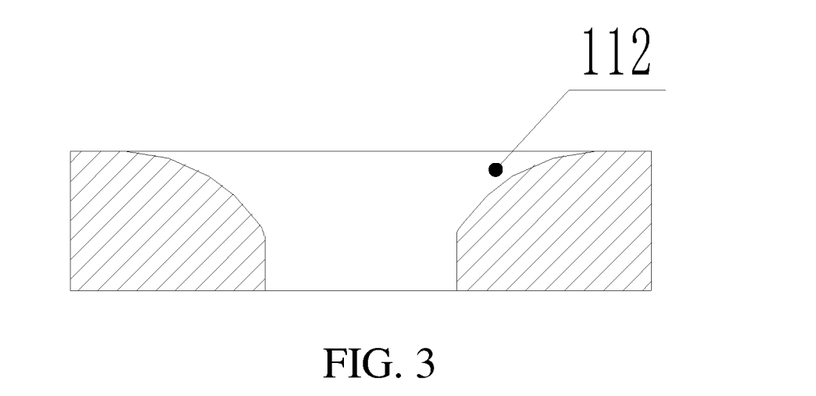
FIG. 3 is a cross-sectional view of a feeding cavity having a trumpet-shaped concave face.
Figure 4:
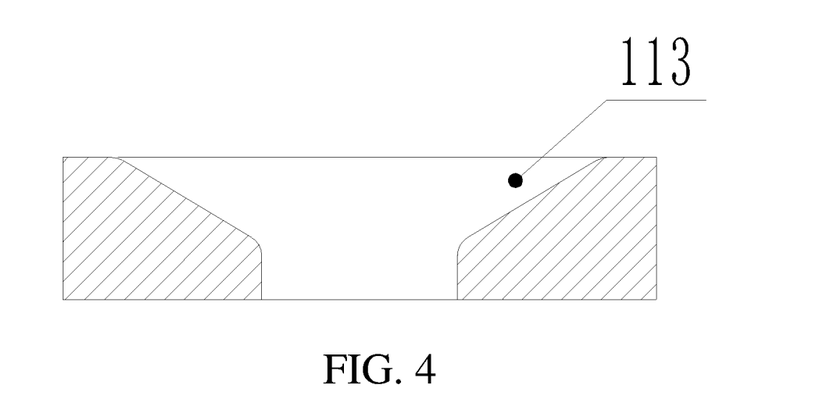
FIG. 4 is a cross-sectional view of a feeding cavity having a conical concave face.

The front face, facing a discharge outlet of an extrusion molding machine, of the die base 10 is provided with the concave feeding cavity 11, the feeding cavity 11 has a bowl-shaped concave face 111, and the bottom of the feeding cavity 11 is provided with the modeling cavity 12 running through the back face of the die base 10; and an intersection between the feeding cavity 11 and the modeling cavity 12 is provided with a smooth chamfered and rounded transitional surface, as shown in FIG. 2.

Figure 5:
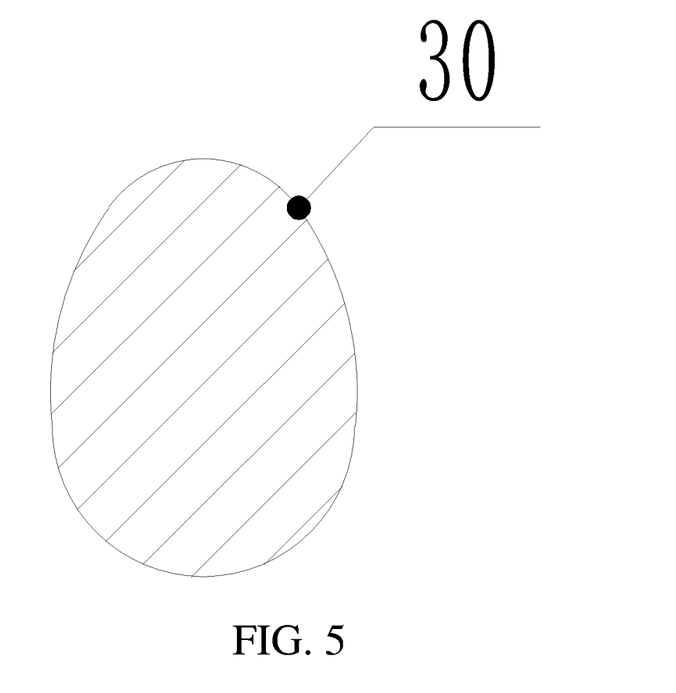
FIG. 5 is a schematic diagram of an egg-shaped cross-section of a core holder.
Figure 6:
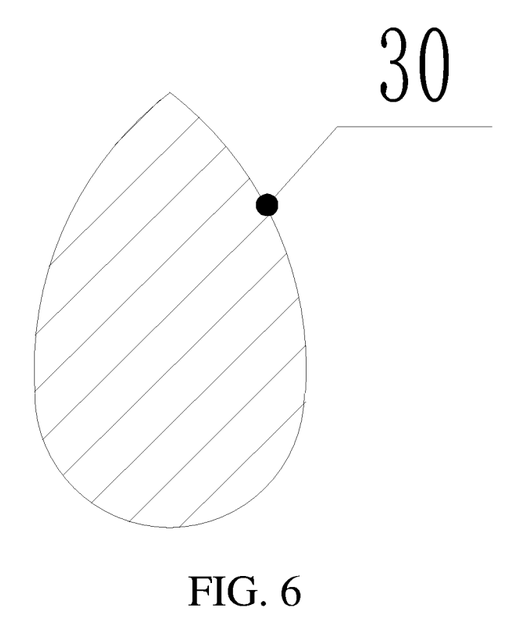
FIG. 6 is a schematic diagram of a heart-shaped cross-section of a core holder.
Figure 7:
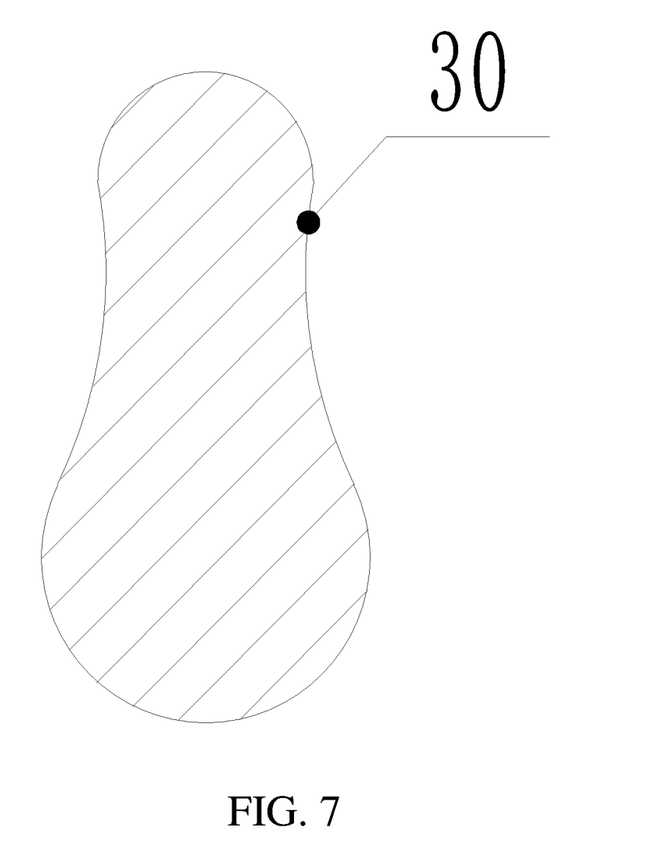
FIG. 7 is a schematic diagram of a pear-shaped cross-section of a core holder.

The arched core holder 30 is two arched supports cross-connected to each other and spanning the feeding cavity 11, and the cross-section of each support is in an egg shape being narrow at the top and wide at the bottom, as shown in FIG. 5; an angle in a cross-connection position of the arched core holder 30 is set to an inner chamfer, and is manufactured into a smooth curved face; and an angle in a position where the supporting feet of the arched core holder 30 are welded to the feeding cavity 11 is also set to an inner chamfer, and is manufactured into a smooth curved face.

The die cores 20 are suspended and positioned in the feeding cavity 11 and the modeling cavity 12 through the fixing function of the core holder 30; columnar portions with the same thickness, suspended in the modeling cavity 12, of the die cores 20 are a main body, the main body is not in contact with the cavity wall of the modeling cavity, each die core 20 corresponds to an inner cavity of a tire, the length direction of the die core is perpendicular to the front face and the back face of the die base 10, a head end of the die core 20 is fixedly connected to the core holder 30, and a tail end of the die core is extended backward and positioned in the modeling cavity 12; and the head end of the die core 20 is relatively thin, the main body is relatively thick, the die core gradually becomes thicker from the head end of the die core to the columnar portions of the main body, the head end of the die core 20 and the core holder 30 are welded as a whole, and a smooth transitional surface is formed by polishing a welding position.

In this embodiment, the intersection between the feeding cavity 11 and the modeling cavity 12, the angle in the position where the supporting feet of the core holder 30 are connected to the feeding cavity 11, and the position where the die core 20 is connected to the core holder 30 are each provided with a smooth curved face, to avoid corner angles and dead angles in the motion direction of the rubber materials, so that retardation or the eddy current does not occur in the entire process of extruding the rubber materials, thereby ensuring the quality of tire blanks and tire products.

The shape of the cross-section of the die core 20 and a relative position of the die core in the modeling cavity 12 are matched with the internal structure and the tire shape of the four-cavity inflation-free tire, and the shape of the cross-section of the modeling cavity 12 is matched with the contour of the tire. The internal structure and the tire shape of the tire refer to structures of a tire cavity and a force-bearing holder; each annular hollow cavity of the inflation-free hollow tire is referred to as a tire cavity, and the shape and the size of the tire cavity depend on the shape and the size of the cross-section of the die core 20; a particular rubber structure formed between tire cavities in the tire is referred to as a force-bearing holder, and the structure of the force-bearing holder depends on the shape of the die cores 20 and relative positions of the die cores in the modeling cavity 12; and the physical performance of the inflation-free hollow tire depends on supporting and pulling functions between the force-bearing holders and between a force-bearing holder and the tire wall, so that the structure of the force-bearing holder has a decisive effect on performance and quality of the tire.

Embodiment 2

Figure 8:
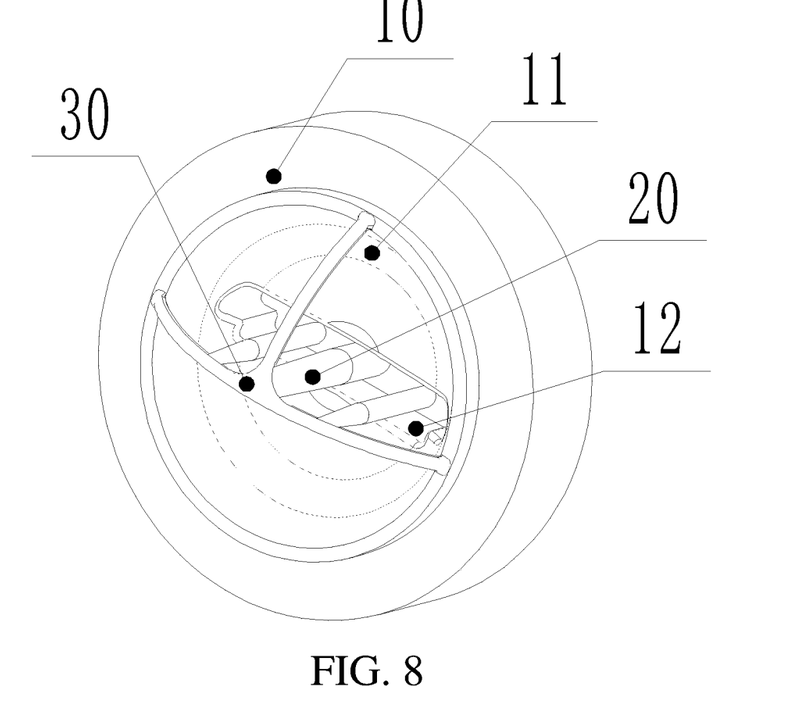
FIG. 8 is a schematic three-dimensional structural diagram of Embodiment 2.

Referring to FIG. 8, an inflation-free hollow tire modeling die of this embodiment is used for producing a three-cavity inflation-free tire. A core holder 30 of the die is formed by three docked half-arched branches, and three die cores 20 are connected to the three branches of the core holder 30.

Embodiment 3

Figure 9:
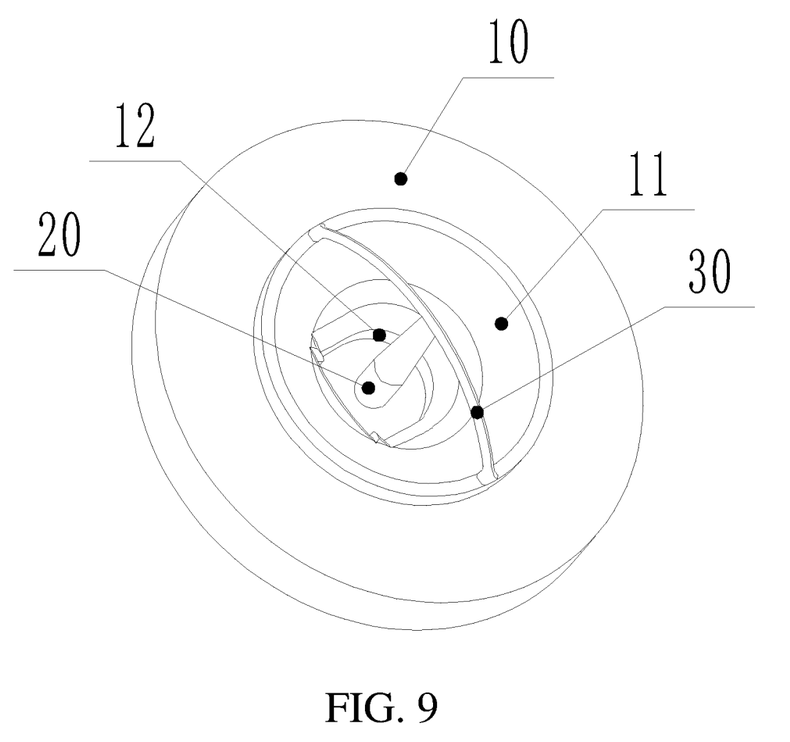
FIG. 9 is a schematic three-dimensional structural diagram of Embodiment 3.

Referring to FIG. 9, an inflation-free hollow tire modeling die of this embodiment is used for producing a single-cavity inflation-free tire. The die includes a die base 10, a die core 20, and an arched core holder 30, the die core 20 is connected to an arch apex position in the middle of the core holder 30, and the cross-section of the arched core holder 30 is in an egg shape being narrow at the top and wide at the bottom. The head end of the die core 20 is relatively thin, the main body is relatively thick, the die core gradually becomes thicker from the head end of the die core to the main body, the head end of the die core and the core holder 30 are welded as a whole, and a smooth transitional surface is formed by polishing a welding position.

Embodiment 4

Figure 10:
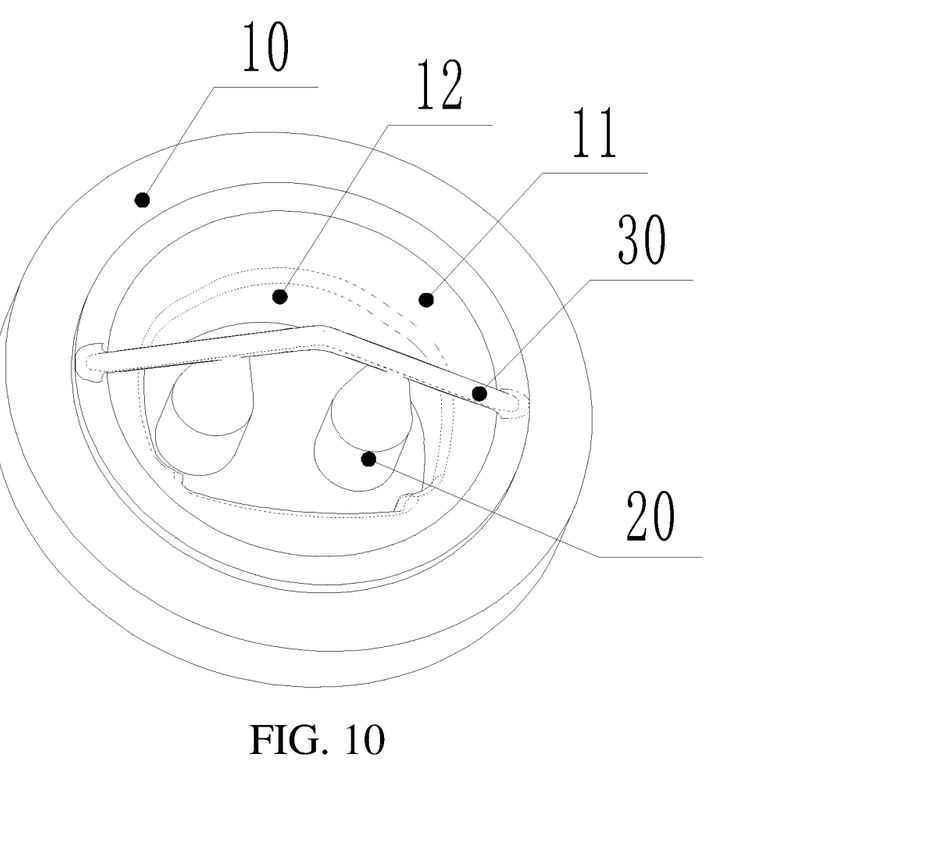
FIG. 10 is a schematic three-dimensional structural diagram of Embodiment 4.

Referring to FIG. 10, an inflation-free hollow tire modeling die of this embodiment is used for producing a two-cavity inflation-free tire. The die includes a die base 10, two die cores 20, and a triangular core holder 30. The triangular core holder 30 is formed by welding top portions of two rod-shaped pillars 301 having a heart-shaped cross-section, and a vertex in a position where the two rod-shaped pillars 301 are welded is provided with a smooth curved face with an outer chamfer; and supporting feet of the two rod-shaped pillars 301 are welded to an outer edge of the feeding cavity 11, and an angle in a position where the supporting feet are welded to the feeding cavity 11 is provided with a smooth curved face with an inner chamfer. The two die cores 20 are respectively connected to upper middle positions of the two rod-shaped pillars 301; and the head end of the die core 20 has the same thickness as that of the main body, the head end of the die core 20 and the core holder 30 are welded as a whole, and a smooth transitional surface is formed by polishing a welding position.

The triangular support in this embodiment or the present disclosure refers to a support structure formed by connecting top portions of more than two rod-shaped pillars together and fixing the feet to the outer edge of the feeding cavity 11, and two rod-shaped pillars in this support structure and feet thereof are connected to form a triangle. In addition to the two-rod docking structure in this embodiment shown in FIG. 10, there may be further a tripod structure formed by three pillars, a pyramid support structure formed by four pillars, and the like.

The invention claimed is:

1. An inflation-free hollow tire modeling die comprising:
    a die base, at least one die core and at least one core holder;
    wherein a front face, facing a discharge outlet of an extrusion forming machine, of the die base has a concave feeding cavity, and a bottom of the feeding cavity has a modeling cavity running through a back face of the die base;
    wherein the at least one core holder comprises an arc support or a triangular support, wherein supporting feet of the arc support or triangular support are fixed to an outer edge portion of the feeding cavity, and a top of the arc support or triangular support is located in front of the modeling cavity and outside the concave feeding cavity;
    wherein the at least one die core comprises a suspended die core whose main body is columnar, wherein the suspended die core corresponds to an inner cavity of a tire, a length direction of the suspended die core is perpendicular to the front face and the back face of the die base, a head end of the suspended die core is fixedly connected to the at least one core holder, and a tail end of the suspended die core is extended backward and positioned in the modeling cavity; and wherein a shape of a cross-section of the suspended die core and a relative position of the suspended die core in the modeling cavity are matched with respective internal structure and a shape of the tire, and a shape of a cross-section of the modeling cavity is matched with a contour of the tire.

2. The inflation-free hollow tire modeling die according to claim 1, wherein a surface of the feeding cavity has a bowl-shaped concave face, a trumpet-shaped concave face, or a conical concave face.

3. The inflation-free hollow tire modeling die according to claim 1, wherein a protrusion at an intersection between the feeding cavity and the modeling cavity is set to an outer chamfer surface.

4. The inflation-free hollow tire modeling die according to claim 1, wherein a cross-section of the at least one core holder has a streamlined ridge.

5. The inflation-free hollow tire modeling die according to claim 4, wherein the streamlined ridge of the cross-section of the at least one core holder has a top that is narrower than a bottom, and is configured to have an egg shape, a pear shape, or a heart shape.

6. The inflation-free hollow tire modeling die according to claim 1, wherein the arc support comprises cross-connected arched support members or docked half-arched support members.

7. The inflation-free hollow tire modeling die according to claim 6, wherein an angle in a position where the support members are connected is set to an inner chamfer.

8. The inflation-free hollow tire modeling die according to claim 1, wherein an angle in a top position where the triangular support connects is set to an inner chamfer.

9. The inflation-free hollow tire modeling die according to claim 1, wherein an angle in a position where the supporting feet of the arc support or triangular support are connected to the feeding cavity is set to an inner chamfer.

10. The inflation-free hollow tire modeling die according to claim 1, wherein the columnar main body of the suspended die core is suspended in the modeling cavity, wherein the main body is not in contact with a cavity wall of the modeling cavity; and wherein the head end and main body of the suspended die core have the same thickness, or the suspended die core gradually becomes thicker from the head end to the main body.

11. The inflation-free hollow tire modeling die according to claim 1, wherein the head end is a terminal end of the suspended die core.

12. The inflation-free hollow tire modeling die according to claim 1, wherein the die base, the at least one die core, and the at least one core holder are made of steel.

13. The inflation-free hollow tire modeling die according to claim 1, wherein the at least one core holder comprises two arched supports that are cross-connected and span over the concave feeding cavity in a convex arc shape.

14. The inflation-free hollow tire modeling die according to claim 13, wherein the two cross-connected arched supports define four branches, and there are exactly four die cores which are respectively connected to the four branches.

15. The inflation-free hollow tire modeling die according to claim 1, wherein the at least one core holder comprises three half-arched branches, and there are exact three die cores which are respectively connected to the three half-arched branches.

16. The inflation-free hollow tire modeling die according to claim 1, wherein the at least one core holder comprises two rod-shaped pillars, and there are exactly two die cores which are respectively connected to upper middle portions of the two rod-shaped pillars.

17. An inflation-free hollow tire modeling die comprising:
    a die base, one or more die cores and a core holder;
    wherein a front face of the die base comprises a feeding cavity facing a discharge outlet of an extrusion forming machine, wherein a back face of the die base comprises a modeling cavity in communication with the feeding activity, wherein the one or more die cores extend from the core holder and into the modeling cavity, wherein feet of the core holder are fixedly connected to an outer edge of the feeding cavity, wherein each die core has a head end and a tail end, wherein the head end is fixedly attached to and terminates at the core holder, wherein the tail end is spaced apart from a wall of the modeling cavity.

18. The inflation-free hollow tire modeling die according to claim 17, wherein the core holder comprises two arched supports that are cross-connected at an arch apex, wherein the arch apex is positioned outside the feeding cavity.

19. The inflation-free hollow tire modeling die according to claim 17, wherein each die core has a columnar portion which has a uniform thickness, wherein each die core tapers from the columnar portion towards the head end.

20. The inflation-free hollow tire modeling die according to claim 17, wherein the core holder comprises one or more support members, wherein a cross-section of each support member defines a top portion and a bottom portion, wherein the bottom portion is closer to the front face of the die base than the top portion, wherein the top portion is narrower than the bottom portion.

\* \* \* \* \*